Feb. 21, 1933.  E. C. NEWCOMB  1,898,460
TWO-CYCLE ENGINE
Filed April 26, 1928  4 Sheets-Sheet 2

UNITED STATES PATENT OFFICE

EDWARD C. NEWCOMB, OF NORTH SCITUATE, MASSACHUSETTS

TWO-CYCLE ENGINE

Application filed April 26, 1928. Serial No. 273,096.

The invention is a two-cycle, carburetor-type engine possessing a range of efficiency and degree of flexibility of control equal to or excelling the four-cycle engine, becoming thereby adapted to automobile service. It involves various principles herein disclosed having to do with the relative location and connection of the various members of the engine adapting it to economical production and convenient maintenance, and also with the method of mixture supply and with its control, whereby the efficiency referred to and also other advantages are secured, and more particularly the invention constitutes an improvement in that type of two-cycle engine which has its clearance space elongated to promote stratiform separation of the fresh charge and burnt gas, such as disclosed in my prior patent, Reissue 16,108, and this particular part of the present invention comprises means for promoting the stratified effect and correspondingly improving efficiency.

In its preferred form, the invention comprehends the principles above alluded to as well as others also exemplified in the engine shown in the accompanying drawings, individually and in combination with each other and in combination with engines generally and in two-cycle engines in particular.

The engine shown comprises a row of four-bloc-cast water-jacketed cylinders 1 mounted on a crank case structure 2, providing a single crank chamber common to all the cylinders and adapted, as customary in automobile engines, to contain the supply of lubricating oil. The arrangement of the piston 3, crank shaft 4, and its several bearings will be recognized as conventional.

The cylinders are provided with exhaust ports 5 on both sides of the row uncovered by the pistons toward the ends of their working strokes. From these ports the burnt gas passes into exhaust manifolds 6 bolted to the cylinder block, one on each side. These manifolds are thin in section along their upper sides and thicker along their lower sides and the gas passes from the ports downwardly through the thin part and then longitudinally or rearwardly in the thicker part which latter part constitutes the main conduit part of the manifold occupying a low position beneath the water jacket of the cylinders. In this position the two exhaust manifolds are most compactly arranged and the one on the inlet side is well separated from the valve rods and their housings. The exhaust discharge from each cylinder is separated from its neighbor by a rearwardly-inclined partition 7 located in the upper or thin part of the manifold, and for the purpose of minimizing back pressure interference between the cylinders, a matter of importance to the case in hand. Each manifold has a connection flange 8 at its rear end for connection to exhaust pipes and mufflers, not shown.

The one-piece cylinder head contains a water-jacketed clearance space for each cylinder which is of elongated form and of relatively small cross-sectional area. The particular shape of clearance space in the present case is that of my prior patent and is comprised of a relatively narrow axial portion, or passage 9, a bulbous elbow 10 and a longer transversely extending passage 11, the compression ratio being 3.9 to 1 more or less. The mixture inlet valve 12 and the spark plug 13 are located in the outer end of the laterally extended portion of the elongated clearance space, most remote from the exhaust ports, and the longitudinal inlet manifold 14 is located in the water-jacketed head structure directly below the inlet valve ports and common to all of them. A secondary spark plug 15 is located at the elbow junction, this being desirable though not essential.

The several inlet valves 12 are operated, in conventional manner, with overlapping periods by a cam shaft 16, appropriately journalled in the crank enclosure, the tappet rods and their valve springs being enclosed in individual housings 17, located on the outer side of the adjacent exhaust manifold 6.

By virtue of its elongated and narrow shape the combustion space is adapted to receive charges of combustible mixture from the inlet valve of varying amounts or volumes, varying from the smallest required for idling to the largest for maximum load and to hold the same during compression with the least dilution with the burnt gas of the previous cycle, that is to say, the shape of the clearance space promotes stratification between the charge mixture on the one hand, which is located always farthest from the piston and in contact with the spark plug, and the remaining exhaust gas on the other, which occupies the part of the space nearest the piston, thereby avoiding loss of fuel through the exhaust ports and causing ignition and combustion to occur in a mixture which is substantially undiluted with exhaust gas and hence of the constant and proper portions determined by the carburetor. Such arrangement adapts the engine to operate with good efficiency throughout its full range of speed, and by the present invention further and substantial gain in efficiency is accomplished in this type of engine by the manner in which the charge mixture of liquid fuel and air is caused to enter the special clearance space on the opening of the inlet valve, that is to say, the charge mixture in the inlet manifold 14 is kept at all times at a pressure which, while not literally constant, is nevertheless steady, in the sense that it is free of substantial fluctuation, and flows through the open inlet port at no time under a greater pressure head than is requisite to cause the desired amount to enter the combustion space within the limit of the open period of the valve, this being in contrast with the conditions obtaining in my prior patent where the pressure of the mixture in the inlet or transfer pipe varies sharply on each stroke from a considerable minus to a considerable plus pressure, that is to say, suction and pressure occur in alternation producing a corresponding surging or oscillation in the transfer pipe which, being active while the valve is open, tends to produce violent changes in the velocity of entrance, in turn producing oscillation of the cylinder contents and correspondingly disturbing the desired stratiform condition.

The steady entering mixture pressure is obtained according to this invention primarily by using a rotary air compressor, or mixture blower, as the source of pressure, and by causing the open periods of the inlet valves served by the single manifold to meet or overlap, thus giving a continuous and nearly constant outlet from the manifold into one or the other of the engine cylinders and allowing no appreciable time period for pressure to build up higher than necessary. Variation of the size or volume of the charge of mixture forced into the compression space on each cycle, thus to control the work to be done by the engine, is accomplished by varying the pressure in the inlet manifold since it is not practical to control the engine by varying the valve timing, but such pressure variation is manual and gradual as compared to the oscillating effects above referred to and hence it is without disturbing influence on the stratiform condition of the mixture in the clearance space. Such engine-controlling pressure variation is done in the present case by the use of the engine throttle in association with other instrumentalities as later explained and constitutes a further and independent part of the invention.

The blower referred to is by preference a positive-action blower, such as the Roots type, and is mounted partly on the cylinder block and partly on the crank case, at the forward end of the engine, that is to say, the forward end as the engine is installed in a motor vehicle. The two impellers or rotors 18 are journalled in the blower casing 19 one vertically above the other, and with the lower or main rotor in line with the engine crank-shaft. The casing 19 is bolted to an appropriate, forwardly projecting flange structure 20 formed on the cylinder block and crank case respectively and so that it forms the end closure of the crank space. The two rotor gears 21 are on the crank-case side of the blower casing and are thus located virtually within the crank enclosure so that they are thereby included in the lubrication system of the engine, which is to say that they are exposed to the oil vapor present in the crank case and they may also have special oil connections with the engine lubricating system. A part of such system is represented by the oil manifold 22.

With the blower located as described the shaft 23 of the main or lower rotor is axially connected to and driven by the engine crank shaft 4 through a flexible or self-compensating coupling 24, formed between an end flange on the crank shaft and the web of the rotor gear 21. The particular design of this coupling is of no consequence except that its two main parts are readily separable to facilitate removal of the blower, as a unit, from the engine when desired.

The forward part of the blower shaft 23 carries and drives a wheel 25 and its extreme tip is cut with notches 26 for engagement by a hand starting crank when one is needed. The wheel 25 just referred to is a pulley which through its belt 27, drives an upper pulley 28 mounted on shaft 29, and the latter drives the usual radiator fan. The wheel 25 thus constitutes a drive member for the engine cooling system which is driven by or through the mixture blower. The shaft 29 may, and preferably does drive also the circulating pump 30 of the water cooling system, the illustrated engine being water-cooled as stated. The blower is thus organized with the other engine members so as to constitute a structural part of the engine or power plant serving engine purposes additional to its primary purpose of mixture supply.

As thus arranged the blower intake 31 and its outlet 32 are respectively located on laterally opposite sides of the blower casing and of the row of engine cylinders, and the outlet 32 is placed on the same side as the inlet manifold 14 and connected to the latter through the casing 34 of the regulating valve presently referred to and an inlet pipe 33. The engine throttle 35 is located on the delivery side of the blower, between the same and the manifold and preferably, as indicated, in the valve casing 34; it may be assumed to be linked to the usual foot pedal for operation by the driver, as usual. The blower intake 31, on the opposite side of the cylinder row, is connected to the carburetor 36 and the latter therefore works by suction as usual, but the location and place of connection of the carburetting means might be otherwise so long as it co-acts with the blower as a pressure source for delivering a proper mixture to the inlet manifold. When connected to the blower intake the carburetor should preferably be of the so-called constant vacuum type, that is to say, comprising a float controlled fuel receptacle delivering to a fuel jet subject to the flow of air through an air entrance which latter is controlled by an air valve loaded by a constant spring or by gravity and as well understood constant-vacuum carburetors are well known in this art. It is preferably provided with a choker or equivalent, not indicated in the drawings.

The arrangement of the blower between the carburetor and the throttle is preferred because of the mixing effect which the revolving rotors have on the liquid fuel and air and because the presence of the throttle between the blower and the manifold tends to hold back or smooth out blower pulsations, especially when it is partly closed. While such pulsations are not violent and always under plus pressure, it is desirable that they be excluded from the manifold so far as possible when the charge admissions are small in volume in order to avoid any disturbance, by oscillation, of the stratified condition thereof at such times, and the restriction represented by the partly closed throttle effectually serves this purpose. Under full throttle, with corresponding large charge admissions, the blower pulsations are not productive of appreciable disturbance, and thus, as the result of the described throttle location, it is quite practical to use a positive action blower, such as the ordinary Root's type, as the pressure source, since the pulsations incident to the operation of this type have no harmful effect.

It will be apparent that the work of the engine is controlled by the throttle 35, the manipulation of which increases and decreases the pressure in the manifold according as it is opened or closed and thereby varies the amount or volume of mixture which passes into the combustion space.

The pressure in the manifold is also indirectly controlled by a supplementary instrumentality which operates to vary the effective output of the blower in accordance with the demand for charge mixture, and which, within the invention, may accomplish this purpose in various ways, but preferably it comprises a valve controlling the rate of flow of air or mixture through a blower return passage 37, which is a passage connecting the valve casing 34 or blower outlet back to the blower inlet 31, around the rotor chamber. It is formed in the casing of the blower and extends over the top of the rotor chamber, from the valve casing 34 to the blower inlet 31, in which location it is compactly disposed and also self-draining of any liquid fuel which might otherwise tend to accumulate in it. The valve which controls the rate of flow through the return pass is a piston-type valve marked 38 and mounted to slide in the cylindrical part of the casing 34 so as to open and close, more or less, the opening from the casing into the return-pass 37. It is subject to the constant load of a tension spring 39 tending to move it against its stop shoulder or seat 40 in which position the return pass 37 is closed. The benefit of the uniform action of a long spring is obtained by making the valve body hollow and connecting one end of the spring to its interior; the other end being connected to a suitable cross-pin in the opposite end of the casing.

As the pressure of the blower overcomes the spring and opens the entrance into the return passage 37, a circulating passage is thereby established through the blower, valve casing and the return pass back to the blower inlet and the flow through this passage is at high velocity so that if the air is already carburetted with liquid fuel, as in the case in hand, the liquid becomes very thoroughly shattered into mist or fog and well homogenized so as to be best adapted for explosive combustion as above pointed out. This preparation of the fuel charge contributes to the fuel economy of this engine and especially for idling and part-throttle work, because at such time the circulation is most vigorous and the liquid fuel correspondingly well broken up. The constant load of the spring on the return valve 38 tends to maintain a constant pressure of the blower discharge measured at the valve casing or on the blower side of the throttle and thereby tends to maintain a constant rate of flow past the throttle 35 for any given condition of engine speed and load but such pressure is not constant in practice under changing speed or load due to variation in the rate of passage of mixture to the engine cylinders. It would not be practical to make the blower large enough, or to drive it so rapidly, as even to approximate a constant pressure on the blower side of the throttle for all loads and speeds, because of the power required to drive such a blower. In the present case the displacement of the blower per revolution is not greater than the engine piston displacement, being in fact about 65% or 75% of it, consuming less than 10 or 12% of the total horse power developed, and according to this invention, the effective output of this relatively small blower is caused to change according to engine needs, making it work harder when delivering larger charges, and when delivering smaller charges, making it work no harder than requisite to cause their proper admission to the place of combustion. Thereby the proportion of the total power taken by the blower and generally referred to as pumping losses, is kept at a minimum.

The invention carries out this principle of blower control by regulating the load on the return valve which is to say, controlling the flow through the return pass, by or in accordance with the variation in the work being done by the engine, and as manifested in any of the variable functions of the engine, for example and preferably, in accordance with the pressure changes of the mixture in the inlet manifold, such pressure being of course always proportional to the work being done. For this purpose the outer end of the valve chamber of the return valve is put in pressure communication, through duct 41 in the wall of casing 34, with the inlet passage on the combustion side of the throttle 35, thus making the load on the return valve variable according to pressure change in the inlet manifold; more exactly, the valve is controlled by the difference of pressures existing on opposite sides of the throttle and accordingly its position of rest is always one of balance between the blower pressure on the one hand, and the force of the spring plus the manifold pressure, on the other. The output of the blower is thus automatically coordinated with each throttle setting under modification by the condition of the manifold pressure existing at the moment, an effect which can obviously be obtained in other ways but which is believed to be most simply obtained by a piston-type return valve arranged in a return pass as shown. Setting the throttle in its idling position, produces the lowest pressure in the manifold, and causes a correspondingly light load on the return valve so that it opens the return pass and most of the mixture then flows round the circulating passage. An increase of throttle opening, say to wide-open position, causes the pressure on the manifold side of the throttle to approximate its maximum for that load and the corresponding increase of load on the return valve balances the pressure existing at its ends and thus closes the return pass, so that the full blower delivery goes to the manifold. For each intermediate throttle position the corresponding balanced position taken by the return valve is fixed so long as the engine load is constant and on any change in load (and corresponding change of speed, which means blower speed) the valve position changes accordingly and in the direction to compensate, thereby insuring that the engine holds its load, so to speak and performs exactly as prescribed by the throttle setting and without tendency to race or slow down and stop. The rate of flow through the return pass will be seen to be independent of the engine speed; with the speed constant, it may be either high or low depending on the engine load.

Figure 6:
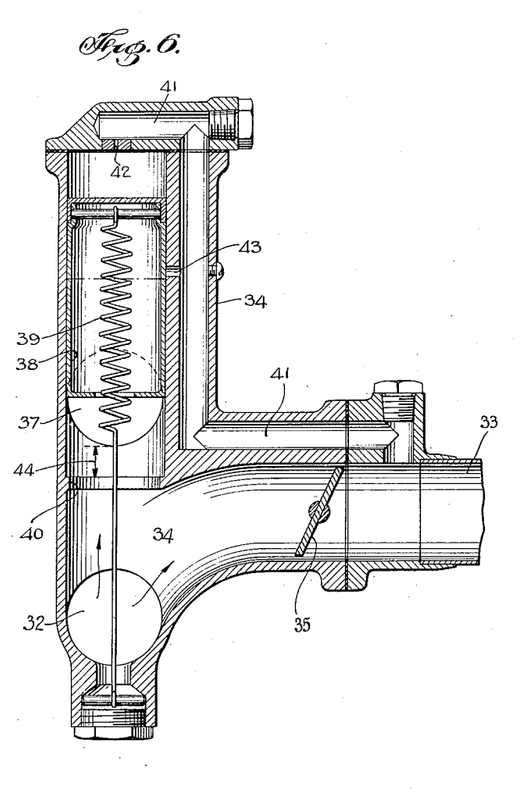
Figure 6 a large scale detail of the return pass valve and casing.

The detail of the supplementary control is important to its best functioning. The stop shoulder 40 is located some distance below the opening to the return pass 37 so that the valve body 38 has a further movement or overrun (indicated by the distance 44 in Fig. 6) after it closes that opening and before it seats against the stop. Pressure changes within the limits of this overrun, which means under full throttle work, are thus without effect on the return passage around the blower and the blower output is safely kept at its maximum. The pressure duct 41 is connected to the valve chamber through two openings, one of which, 42, is small and the other, 43, is much larger and controlled by the valve itself. It is uncovered and open while the valve is in its overrun position, but closed by the valve before it rises far enough to open the return pass 37. This gives quickest response to pressure conditions while the valve is in its extreme closed position, while in all other positions the pressure communication is limited to the fine hole 42 through which the pressure transmission is less rapid though still substantially instantaneous; the effect of the restriction being to damp the valve movement enough to prevent fluttering, but damping for this purpose can also be accomplished by ordinary dash-pot action if desired. The behavior of the valve is satisfactory when designed in substantially the proportions indicated, the valve spring being arranged to exert a pull of about 16 oz. per square inch of piston area. Enough liquid fuel is deposited on the valve to serve for such lubrication as it requires.

With present day fuels, some heat is desirable for assisting vaporization and is applied in the present case, to the circulating passage, and by means of a water jacket 45 formed on the underside of the blower casing and connected by appropriate ducts or otherwise into the water cooling system of the engine. This may be done in any way, and exhaust-gas heat might be used instead of the water. In the present case the engine jacket water passes from the offtake 46 which leads from the cylinder head to the radiator (not shown) through pipe 47 to the blower jacket and thence by pipe 48 to the lower hose or return line 49 leading from the bottom of the radiator, as usual, to the suction side of the water pump, the jacket 45 being thus connected so that it constitutes the lowest point in the entire water system and so that by opening the drain plug 50 in its bottom the radiator may be drained out.

Figure 1:
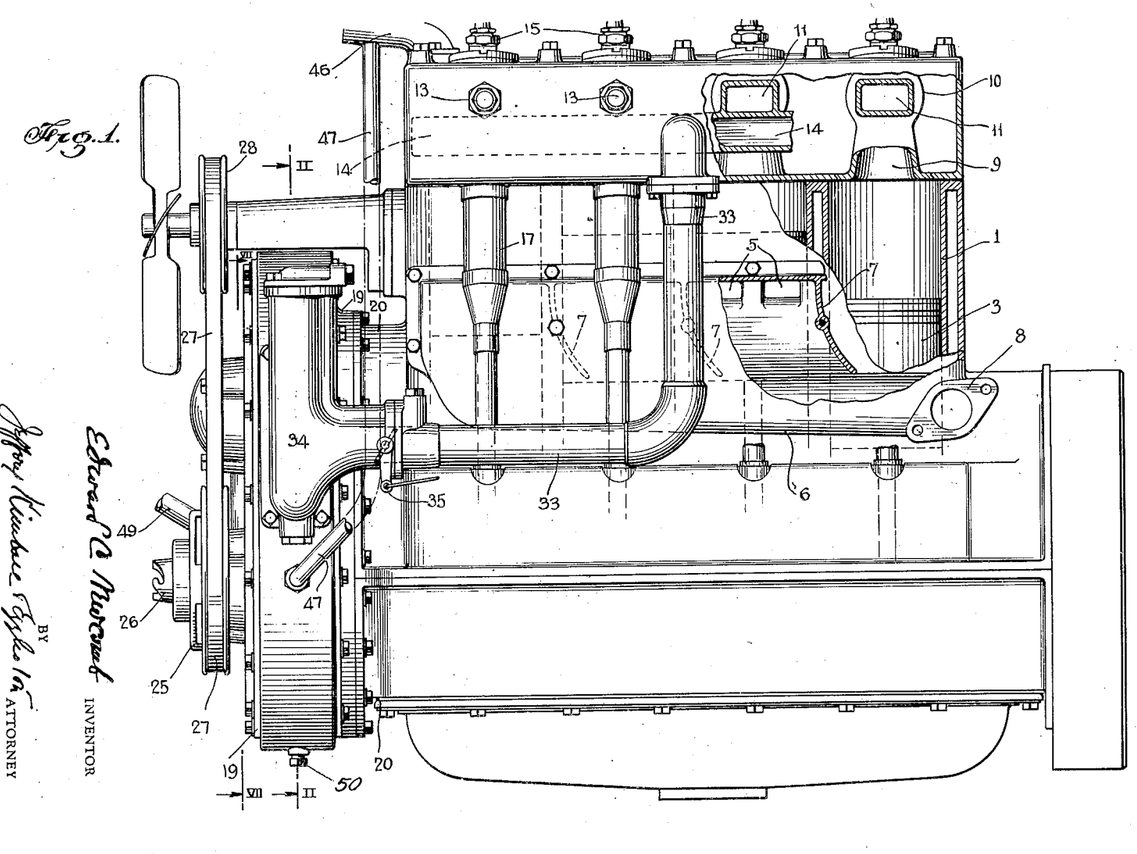
Figure 1 is a side elevation of an engine exemplifying the invention, with parts broken away.
Figure 2:
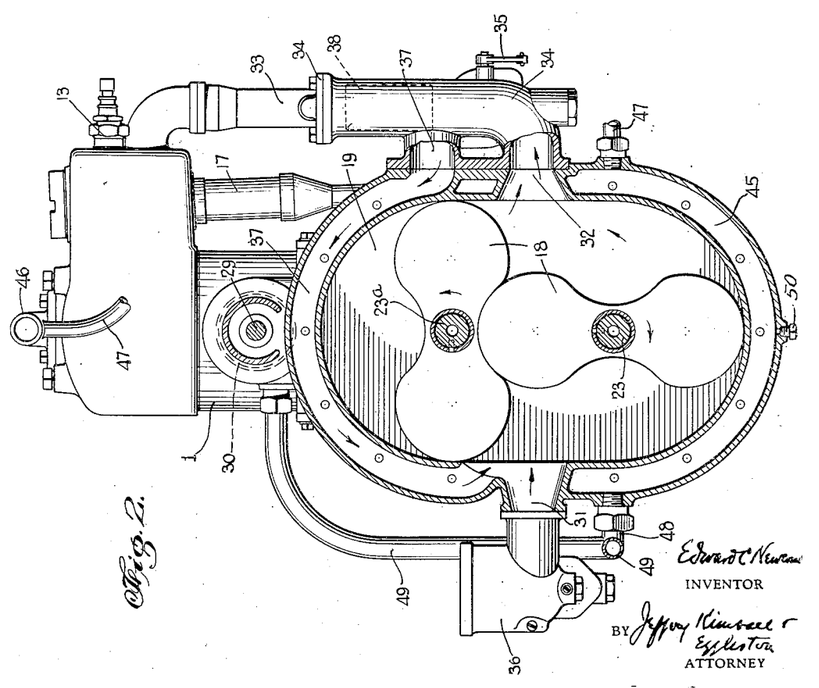
Figure 2 is a section on line II—II of Fig. 1.
Figure 3:
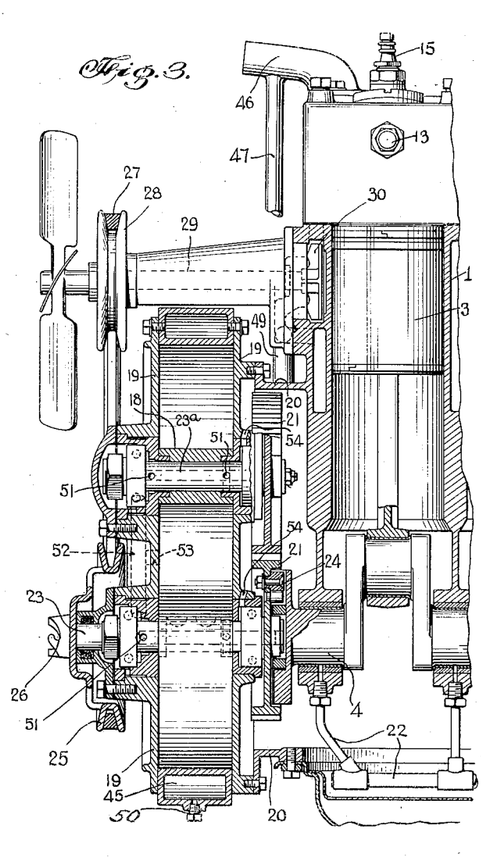
Figure 3 is a central vertical section through the mixture blower.
Figure 4:
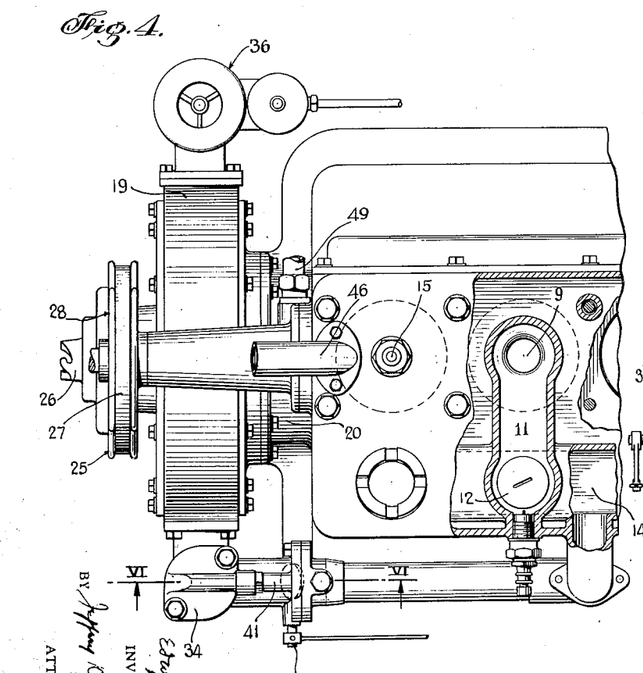
Figure 4 a top plan, partly in section of the forward end of the engine.
Figure 5:
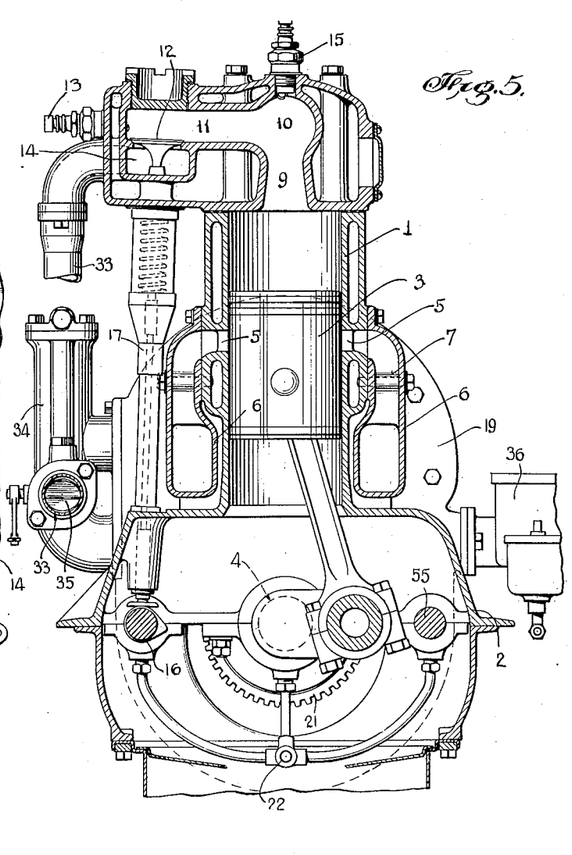
Figure 5 a transverse vertical section in the plane of one of the cylinders.
Figure 7:
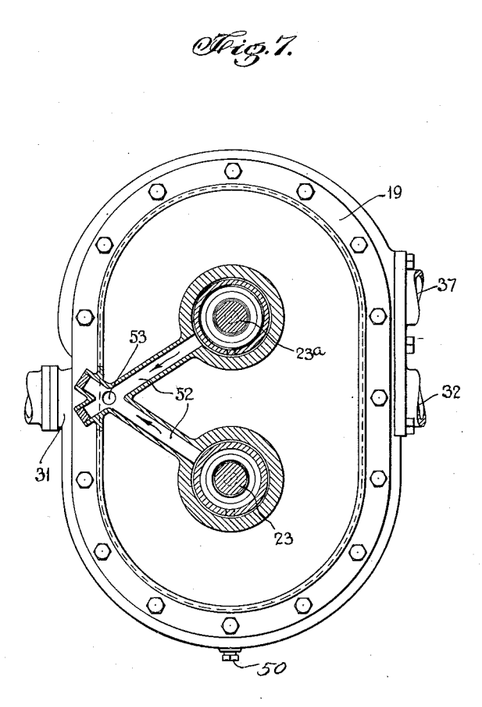
Figure 7 is a section on line VII—VII of Figure 1.

With the mixture blower forming part of the crank enclosure as above described, it is important that none of the mixture escape through the journal-bearings of the blower and contaminate the supply of lubricating oil in the crank-case and for this reason each blower bearing is put into communication with the suction side of the blower, so that any leakage will be inward, toward the blower, rather than otherwise. This is accomplished by making each rotor shaft, 23 and 23a, tubular as shown by dotted lines in Figs. 3 and 7, and with radial holes 51 opening into the spaces in which the bearings, ball bearings in the present case, are contained, and connecting the forward bearing spaces to the suction side of the blower by means of the oblique ducts 52 (Fig. 7) and the hole 53 (Figs. 3 and 7). In this way all the bearings are kept under a slight minus pressure. The ducts may be formed in the metal of the front plate of the blower casing as indicated in Fig. 7, or arranged in any other convenient way. The crevices around the bearings are made sufficiently small to avoid shortcircuiting of mixture through the ducts and as a matter of preference they are purposely put in communication also with the crank enclosure by means of small holes 54 leading directly into the bearings from the crank space, as shown in Fig. 3, so that oil or oil vapor from the crank space will be drawn into and through the blower bearings for lubricating the latter. The front as well as the rear bearings will be thus lubricated. With such arrangement the blower bearings could be plain instead of ball bearings, if preferred, and in respect of this method of lubrication, it is obviously not material whether the blower operates on fuel mixture, as preferred in the present case, or merely air, since in any case automatic blower lubrication is obtained.

A particular advantage results from the circulation of mixture through the return passage and blower accounting in large measure for the superior flexibility and fuel economy obtained at low loads. It will be observed that such circulation occurs only when the throttle is partly closed and only when the delivery pressure of the blower is sufficient to lift the return valve against its spring and fluid-pressure loads. The circulation thus involves an abrupt and considerable pressure drop and considerable velocity both of which are conducive to thorough fuel vaporization and good homogeneity of mixture, a result which is further promoted by the slippage of the liquid particles of the mixture past the lobes of the blower rotors, under the pressure referred to, and the pulverizing effect incident thereon. With such perfected fuel mixture delivered as small charges past the throttle and at a steady inlet pressure as above explained, the virtues of the special form of elongated combustion space are obtained in the maximum degree and the fuel system of this invention thus coacts with said special form of combustion space to form a highly effective and novel combination.

The engine will be understood to be provided with all such appurtenances as are usual in automotive engines though not shown in the drawings. The generator and distributor may be driven from the cam shaft 16 or from an opposite shaft 55 (Fig. 3) and the oil pump, from either of them, all in accordance with the preference of the manufacturer. It will be necessary for satisfactory high speed operation such as contemplated in the present case, in a speed range of 100 to 2000 for example, to provide suitable means for counteracting unbalanced vibratory forces in the engine, but no means for this purpose are herein shown since the principles thereof are well understood in the art.

The practical advantages of the described organization of the blower with the other members of the engine structure so that it constitutes an integral part thereof, will be plain to the engine manufacturer without explanation, and it will be apparent that various deviations from the illustrated design are possible without sacrifice of such advantages, and accordingly that the same are to be understood as comprehended by the claims herein, and it will be understood in particular, that although in the preferred form illustrated the system of mixture regulation herein described is more or less intimately involved with such mechanical features of blower assembly and organization and also with the combustion principles of my prior patent, it is not in fact to be understood as limited to combination with either of them, except of course as pointed out in the claims.

I claim:

1. A multi-cylinder two-cycle engine having its cylinders arranged in a row and having its carburetor on one side of the row and its inlet manifold extending along the opposite side of the row and means to supply said manifold with charge mixture under pressure comprising a rotary blower mounted at one end of said row with its rotary axis parallel therewith and having its intake connected to the carburetor and its outlet to said manifold and a throttle valve on the engine side of the blower.

2. A multi-cylinder two-cycle engine comprising a row of engine cylinders, a positive-action rotary blower at the end of the row having its rotor member directly-connected to the engine crank-shaft and provided with horizontal and laterally opposite intake and outlet connections, a carburetor connected to the blower intake, on one side, and an inlet manifold for the cylinders connected to the blower outlet on the other side and a throttle valve on the engine side of the blower.

3. A multi-cylinder two-cycle engine having cylinders in a row and a rotary blower at the end of the row with its axis parallel therewith, a carburetor connected to the blower on one side of the row, a passage connecting the opposite side of the blower with the cylinders, and an engine throttle intercepting the mixture flow in said passage.

4. A multi-cylinder two-cycle engine comprising cylinders in a row, a positive action rotary blower with its axis parallel to the row and with its casing forming the end closure of said crank chamber and its drive gear within said chamber, a passage connecting the blower outlet to said cylinders and a carburetor connected to the blower inlet.

5. In a two-cycle engine having a rotary mixture blower, the casing of which serves a part of the crank space enclosure, means to prevent mixture leakage through a blower bearing to said space comprising a passage connecting the bearing with the suction side of the blower.

6. In a two-cycle engine, a mixture blower connected by its suction to a carburetor and by its outlet to the engine inlet port, and means associated with said blower for heating the mixture while passing therethrough.

7. In a multi-cylinder two-cycle engine, the combination of a row of water-cooled cylinders, a common crank space therefor, a blower with its casing forming the closure for the forward end of said space, and provided with a water-jacket connected with the cylinder jackets and engine-cooling means driven from the forward side of said blower.

8. In a water-cooled engine, a rotary blower for supplying charge mixture, having a water-jacket included in the engine cooling system.

9. In a water-cooled engine, a water-jacketed rotary blower the casing whereof forms part of the crank enclosure and the water-jacket whereof has a drain plug, adapted to drain the cooling water system of the engine.

10. In a two-cycle engine, the combination of its lubrication and cooling systems, and a rotary blower for supplying charge mixture under pressure to the cylinders, the journal bearing of the rotor of said blower included in said lubrication system and the casing of said blower being included in the flow of the engine cooling medium.

11. In a two-cycle engine, a mixture system including a rotary blower, a carburetor connected to the intake thereof, a return passage for the blower, therewith forming a circulating mixture passage, means for transferring engine heat to the circulating mixture, a passage for conducting the mixture so heated to the combustion space and means for varying the flow through the passage.

12. In a two-cycle engine in combination, a cylinder having a clearance space elongated to produce stratiform separation of mixture charge and burnt gas, the exhaust port being uncovered by the piston and the spark plug and inlet valve being at the end of said space most remote from the piston, a passage to supply charge mixture through said valve to said space, means for maintaining a steady mixture pressure in said passage while said valve is open and means for varying said pressure to control the volume of the admitted charge.

13. In a multi-cylinder two-cycle engine, the combination of each cylinder having exhaust ports uncovered by the piston therein and a clearance space elongated to produce stratiform separation of mixture charge and burnt gas and provided with an igniter and inlet valve at the remote end of said space, a manifold in constant communication with one or more of said spaces through said valves, and a rotary blower and liquid fuel carburetor connected to said manifold and maintaining a steady mixture pressure therein except as varied to change the volume of the admitted charge and means to vary said pressure for the latter purpose.

14. The combination in a multi-cylinder two-cycle engine each cylinder whereof is provided with exhaust ports uncovered by the piston therein and with a transversely elongated combustion and clearance space having an inlet valve at the end of said space most remote from the exhaust ports, of a manifold common to all said valves, a carburetor, an engine-driven positive action blower connecting the carburetor to said manifold and a manually operated throttle between the blower and the manifold.

15. In a multi-cylinder two-cycle engine, the combination of each cylinder having exhaust ports uncovered by the piston therein and a clearance space elongated to produce stratiform separation of mixture charge and burnt gas and provided with an igniter and inlet valve at the remote end of said space, a manifold in constant communication with one or more of said spaces through said valves, and a fuel mixture supply system including a circulating passage connected to said manifold and means for conjointly controlling the rate of circulation and the rate of mixture flow to said manifold.

16. In a multi-cylinder two-cycle engine, the combination of each cylinder having exhaust ports uncovered by the piston therein and a clearance space elongated to produce stratiform separation of mixture charge and burnt gas and provided with an igniter and inlet valve at the remote end of said space, a manifold in constant communication with one or more of said spaces through said valves, and a mixture supply system including a liquid fuel carburetor feeding mixture to an engine-driven rotary blower which delivers said mixture to said manifold, and an engine-controlling throttle between the blower and said manifold.

17. The combination in a two-cycle engine having exhaust ports uncovered by the piston therein and an elongated combustion space and provided with an igniter and inlet valve at the end of said space most remote from said exhaust ports, of mixture supply means comprising a carburetor, a circulating passage, an engine-driven blower adapted to force mixture through said passage at a rate variable independently of the engine speed and means for conducting mixture from said passage to said inlet valve.

18. The combination with a two-cycle engine cylinder and combustion space of means to supply charge mixture thereto under pressure including a rotary blower, having a displacement not exceeding the piston displacement, a throttle on the pressure side thereof to vary the flow from the blower to said space and means for automatically varying the work done by said blower in accordance with variation of the work done by the engine.

19. The combination in a two-cycle engine, of means to supply charge mixture thereto under pressure including a positive-action, engine-driven rotary blower having a displacement not exceeding the piston displacement, a throttle subject to manual control for varying the flow from said blower to the engine cylinder and means for varying the work done by said blower in accordance with variation of work done by the engine.

20. The combination in a two-cycle engine, of means for supplying charge mixture thereto under pressure and two cooperating means for controlling the mixture pressure at the engine inlet valve, one of said means being the working throttle subject to manual control and the other being subject to automatic control according to a variable function of the engine.

21. Mixture supply means for internal combustion engines, comprising in combination with the engine inlet passage and carburetor, of a blower with a return passage, a loaded valve for said passage, and means for varying said load in accordance with variation of a variable function of the engine.

22. Mixture supply means for internal combustion engines, comprising in combination with the engine inlet passage and carburetor, of a blower with a return passage, a spring-loaded valve for said passage, and means for imposing an additional load on said valve variable in accordance with a variable function of the engine.

23. Mixture supply means for internal combustion engines, comprising in combination with the engine inlet port and carburetor, a circulating passage, a throttle between said passage and inlet port and means for controlling the flow in the circulating passage in accordance with pressure variation on the port side of the throttle.

24. Mixture supply means for internal combustion engines, comprising in combination with the engine inlet port and carburetor, a circulating passage, a throttle between said passage and said port and means for controlling the flow in the circulating passage in accordance with variation of the pressure difference on opposite sides of the throttle.

25. A mixture supply system for internal combustion engines, comprising in combination with a carburetor and the engine inlet port, an engine-driven blower, a throttle between said port and blower and means for controlling the blower output in accordance with variation of pressure on opposite sides of the throttle.

26. A mixture supply for internal combustion engines, comprising in combination with the engine inlet port and a carburetor, of an engine-driven blower, a throttle between said port and blower and pressure-operated means for varying the output of the blower according to variation of work done by the engine and independently of the speed thereof.

27. The combination in a two-cycle engine, of means including an engine driven blower for delivering charge mixture under pressure and having a displacement not exceeding the piston displacement, a manually controlled member to vary the rate of mixture admission to the engine cylinder and means including a blower return pass to vary the blower output.

28. In a two-cycle engine, the combination of means including the engine-driven, positive-action blower receiving charge mixture and delivering the same under pressure, a throttle for said mixture delivery, means including a return passage for varying the blower output and means whereby the opening of the throttle increases such output, the engine speed being constant.

29. The combination in a two-cycle engine, means for producing a mixture of fuel and air, means for causing a circulation of such mixture, a passage for conducting a part of such circulating mixture to the engine cylinder under pressure; and means for conjointly restricting said passage and varying the rate of mixture circulation.

30. The combination in a two-cycle engine, of an engine-driven, positive blower arranged to cause circulation of engine charge mixture, a passage conducting such mixture to the engine cylinder, a throttle in said passage, and means operating to increase the rate of said mixture circulation under closing movement of said throttle.

31. In a two-cycle engine, a carburetor, an engine-driven, positive-action blower having a return passage an engine throttle for controlling connection between the blower and the engine cylinder and means for varying the flow in said return passage independently of the engine speed.

32. In a two-cycle engine the combination of an engine-driven, positive-action blower and carburetor together adapted for producing circulation of engine charge mixture, a passage for conducting said mixture to the engine and fluid-pressure-operated means to vary the rate of circulation.

33. In a two-cycle engine in combination, a cylinder having a clearance space elongated to produce stratiform separation of mixture charge and burnt gas, the exhaust port being uncovered by the piston and the spark plug and inlet valve being at the end of said space most remote from the piston, a passage to supply charge mixture through said valve to said space, an engine-driven rotary blower for maintaining a steady mixture pressure in said passage while said valve is open, manual means for varying said pressure to control the volume of the admitted charge, and means automatically varying the work done by said blower in accordance with variation of the work done by the engine.

34. In a multi-cylinder two-cycle engine, the combination of each cylinder having exhaust ports uncovered by the piston therein and a clearance space elongated to produce stratiform separation of mixture charge and burnt gas and provided with an igniter and inlet valve at the remote end of the said space, a manifold in constant communication with one or more of said spaces through said valves, and an engine-driven rotary blower and a liquid fuel carburetor both connected to said manifold, a throttle to vary the pressure in said manifold and means supplementary to said throttle for automatically varying the blower output independently of the engine speed.

35. In a two-cycle engine operating on liquid fuel, the combination of a mixture-receiving blower and return passage together constituting a mixture-circulating passage, an inlet manifold in communication with said passage and a member active during low engine loads to impose resistance to such circulation.

36. In a two-cycle engine the combination of a mixture-compressing device and return passage together constituting a mixture circulation passage, a plurality of elongated combustion spaces in communication with said passage having their inlet and ignition means at points most remote from their respective pistons, a throttle in said communication and a member active on low engine loads for imposing resistance to the flow of mixture through said circulation passage.

37. In a two-cycle engine the combination of a mixture compressing blower and return pass together constituting a mixture circulation passage, a plurality of elongated combustion spaces in communication with said passage having their inlet and ignition means at points most remote from their respective pistons, a throttle in said communication and a resiliently loaded valve device imposing variable resistance to mixture flow in said circulation passage according to adjustment of said throttle.

38. In a two-cycle engine operating on liquid fuel, the combination of a mixture compressing device and return passage together constituting a mixture circulation passage, means for transferring engine heat to said passage, a plurality of elongated combustion spaces in communication with said passage having their inlet and ignition means at points most remote from their respective pistons, a throttle in said communication and a member active on low engine loads for imposing resistance to said mixture circulation.

39. The combination in a two-cycle engine of means for supplying charge mixture under pressure, including an engine-driven blower and means to vary the blower output independently of engine speed comprising a device responsive to pressure fluctuation in the engine inlet passage.

40. In a two-cycle engine, the combination of means including an engine-driven blower for supplying charge mixture under pressure, and means to vary the blower output comprising a piston type valve, subject to blower pressure on one side and another pressure on the opposite side, and means for communicating the latter pressure to the valve including a hole adapted to be closed by said valve.

41. In a two-cycle engine, an engine-driven positive blower device delivering to the combustion space thereof and having a return passage, a valve controlling the flow in said passage and means for damping the movement of said valve.

42. In an engine, compressor mechanism delivering to the combustion space thereof and having a return passage, a valve for said passage having a load acting thereon which is variable according to a variable function of the engine and means for damping the valve movement.

43. In an engine, compressor mechanism receiving and delivering fuel mixture to the combustion space and having a return passage, a valve opposing flow through said passage having a load variable according to a variable function of the engine and means to damp the movement of said valve.

44. In an engine, compressor mechanism delivering through a passage to the combustion space, a throttle in said passage, a return passage for said mechanism and an automatic valve for closing said passage, having an overrun beyond its passage-closing position.

45. In a two-cycle engine, the combination of means including an engine-driven blower constituting a pressure supply of charge mixture, a return passage and valve therefor adapted to vary the blower output, said valve being subject to operation by differences of fluid pressure in the mixture inlet system, and means for damping the movement of said valve under such differences.

46. In a two-cycle engine the combination of an engine-driven positively-acting blower, a constant vacuum carburetor connected to the intake thereof and a throttle-controlled passage connecting the outlet thereof to the engine inlet port.

47. The combination in a two-cycle engine, of an engine-driven positive-action rotary blower having a displacement not in excess of the piston displacement, a constant-vacuum carburetor connected to the blower intake, a throttle-containing passage connecting the blower outlet to the engine inlet port and means for automatically varying the work done by the blower in proportion to the work done by the engine.

48. A two-cycle engine having an engine-driven rotary blower with its suction intake connected to a carburetor and its pressure outlet connected to the engine inlet port and means between the blower and the engine inlet port for regulating the rate of mixture flow through said port.

49. In an engine, compressor mechanism receiving and delivering fuel mixture through a mixture passage to the combustion space and having a return passage communicating with the mixture passage at the lowest point in said passage and a loaded valve for closing the return passage.

In testimony whereof, I have signed this specification.

EDWARD C. NEWCOMB.